(12) United States Patent
Ayer et al.

(10) Patent No.: US 7,843,510 B1
(45) Date of Patent: *Nov. 30, 2010

(54) METHOD AND SYSTEM FOR COMBINING VIDEO SEQUENCES WITH SPATIO-TEMPORAL ALIGNMENT

(75) Inventors: Serge Ayer, Ecublens (CH); Martin Vetterli, Grandvaux (CH)

(73) Assignee: Ecole Polytechnique Federale de Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/234,036

(22) Filed: Jan. 19, 1999

Related U.S. Application Data

(63) Continuation-in-part of application No. 09/013,772, filed on Jan. 16, 1998, now Pat. No. 6,320,624.

(51) Int. Cl.
H04N 9/74 (2006.01)
(52) U.S. Cl. .............. 348/584; 348/586; 348/513; 348/157; 348/159
(58) Field of Classification Search ......... 348/584–600, 348/157, 159, 512, 513, 564, 565
See application file for complete search history.

(56) References Cited

U.S. PATENT DOCUMENTS

| | | | | |
|---|---|---|---|---|
| 4,157,572 A | 6/1979 | Kennedy et al. | ............... | 360/33 |
| 4,183,056 A | 1/1980 | Evans et al. | ................. | 358/108 |
| 4,364,086 A | 12/1982 | Guth | ......................... | 358/101 |
| 4,713,695 A | 12/1987 | Macheboeuf | ............... | 358/183 |
| 4,777,641 A | 10/1988 | Inagaki et al. | ................. | 378/34 |
| 4,843,483 A | 6/1989 | Bogner | ........................ | 358/335 |
| 5,055,926 A | 10/1991 | Christensen et al. | ........ | 358/128 |
| 5,184,295 A | 2/1993 | Mann | ......................... | 364/410 |
| 5,249,967 A | 10/1993 | O'Leary et al. | ............. | 434/247 |
| 5,367,286 A | 11/1994 | Voillat | .................... | 340/323 R |
| 5,502,482 A | 3/1996 | Graham | ..................... | 348/140 |
| 5,566,251 A | 10/1996 | Hanna et al. | ................ | 382/284 |
| 5,629,988 A | 5/1997 | Burt et al. | ................... | 382/276 |
| 5,751,368 A | 5/1998 | Cooper | ...................... | 348/512 |
| 5,764,306 A | 6/1998 | Steffano | ..................... | 348/586 |
| 5,904,484 A | 5/1999 | Burns | ......................... | 434/252 |
| 6,034,740 A | 3/2000 | Mitsui et al. | ................ | 348/587 |

FOREIGN PATENT DOCUMENTS

| | | | |
|---|---|---|---|
| DE | 4135385 | * | 5/1992 |
| EP | 0669758 | | 8/1995 |
| JP | 07162744 | | 6/1995 |
| JP | 09166609 A | * | 6/1997 |
| JP | 10-243382 | * | 9/1998 |
| WO | WO 90/04848 | * | 5/1990 |
| WO | 9505873 | | 3/1995 |

* cited by examiner

*Primary Examiner*—M. Lee
(74) *Attorney, Agent, or Firm*—Moore & Van Allen PLLC; Steven B. Phillips

(57) ABSTRACT

Given two video sequences, a composite video sequence can be generated which includes visual elements from each of the given sequences, suitably synchronized and represented in a chosen focal plane. For example, given two video sequences with each showing a different contestant individually racing the same down-hill course, the composite sequence can include elements from each of the given sequences to show the contestants as if racing simultaneously. A composite video sequence can be made also by similarly combining a video sequence with an audio sequence.

23 Claims, 4 Drawing Sheets

METHOD AND SYSTEM FOR COMBINING VIDEO SEQUENCES WITH SPATIO-TEMPORAL ALIGNMENT

CROSS-REFERENCE TO RELATED APPLICATION

This application is a continuation-in-part of, and claims priority from Appl. Ser. No. 09/013,772, filed Jan. 16, 1998, now U.S. Pat. No. 6,320,624, the entire disclosure of which is incorporated herein by reference.

TECHNICAL FIELD

The present invention relates to visual displays and, more specifically, to time-dependent visual displays.

BACKGROUND OF THE INVENTION

In video displays, e.g. in sports-related television programs, special visual effects can be used to enhance a viewer's appreciation of the action. For example, in the case of a team sport such as football, instant replay affords the viewer a second chance at "catching" critical moments of the game. Such moments can be replayed in slow motion, and superposed features such as hand-drawn circles, arrows and letters can be included for emphasis and annotation. These techniques can be used also with other types of sports such as racing competitions, for example.

With team sports, techniques of instant replay and the like are most appropriate, as scenes typically are busy and crowded. Similarly, e.g. in the 100-meter dash competition, the scene includes the contestants side-by-side, and slow-motion visualization at the finish line brings out the essence of the race. On the other hand, where starting times are staggered e.g. as necessitated for the sake of practicality and safety in the case of certain racing events such as downhill racing or ski jumping, the actual scene typically includes a single contestant.

SUMMARY OF THE INVENTION

For enhanced visualization, by the sports fan as well as by the contestant and his coach, displays are desired in which the element of competition between contestants is manifested. This applies especially where contestants perform sole as in downhill skiing, for example, and can be applied also to group races in which qualification schemes are used to decide who will advance from quarter-final to half-final to final.

We have recognized that, given two or more video sequences, a composite video sequence can be generated which includes visual elements from each of the given sequences, suitably synchronized and represented in a chosen focal plane. For example, given two video sequences with each showing a different contestant individually racing the same down-hill course, the composite sequence can include elements from each of the given sequences to show the contestants as if racing simultaneously.

A composite video sequence can be made also by similarly combining one or more video sequences with one or more different sequences such as audio sequences, for example.

DETAILED DESCRIPTION

Conceptually, the invention can be appreciated in analogy with 2-dimensional (2D) "morphing", i.e. the smooth transformation, deformation or mapping of one image, I1, into another, I2, in computerized graphics. Such morphing leads to a video sequence which shows the transformation of I1 into I2, e.g., of an image of an apple into an image of an orange, or of one human face into another. The video sequence is 3-dimensional, having two spatial and a temporal dimension. Parts of the sequence may be of special interest, such as intermediate images, e.g. the average of two faces, or composites, e.g. a face with the eyes from I1 and the smile from I2. Thus, morphing between images can be appreciated as a form of merging of features from the images.

The invention is concerned with a more complicated task, namely the merging of two video sequences. The morphing or mapping from one sequence to another leads to 4-dimensional data which cannot be displayed easily. However, any intermediate combination, or any composite sequence leads to a new video sequence.

Of particular interest is the generation of a new video sequence combining elements from two or more given sequences, with suitable spatio-temporal alignment or synchronization, and projection into a chosen focal plane. For example, in the case of a sports racing competition such as downhill skiing, video sequences obtained from two contestants having traversed a course separately can be time-synchronized by selecting the frames corresponding to the start of the race. Alternatively, the sequences may be synchronized for coincident passage of the contestants at a critical point such as a slalom gate, for example.

The chosen focal plane may be the same as the focal plane of the one or the other of the given sequences, or it may be suitably constructed yet different from both.

Of interest also is synchronization based on a distinctive event, e.g., in track and field, a high jump contestant lifting off from the ground or touching down again. In this respect it is of further interest to synchronize two sequences so that both lift-off and touch-down coincide, requiring time scaling. The resulting composite sequence affords a comparison of trajectories.

With the video sequences synchronized, they can be further aligned spatially, e.g. to generate a composite sequence giving the impression of the contestants traversing the course simultaneously. In a simple approach, spatial alignment can be performed on a frame-by-frame basis. Alternatively, by taking a plurality of frames from a camera into consideration, the view in an output image can be extended to include background elements from several sequential images.

Figure 1:
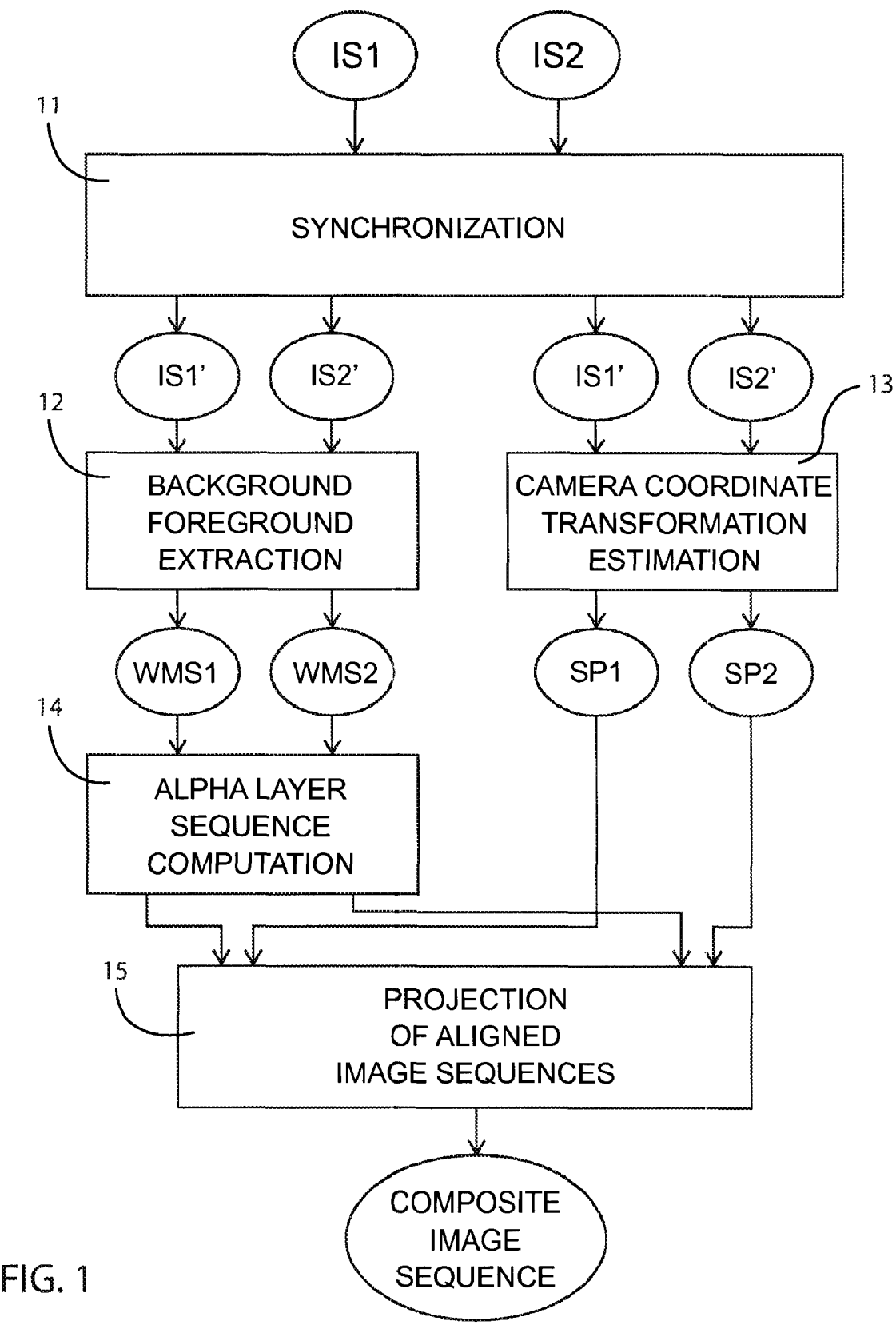
FIG. 1 is a block diagram of a preferred embodiment of the invention.

Forming a composite image involves representing component scenes in a chosen focal plane, typically requiring a considerable amount of computerized processing, e.g. as illustrated by FIG. 1 for the special case of two video input sequences.

FIG. 1 shows two image sequences IS1 and IS2 being fed to a module 11 for synchronization into synchronized sequences IS1' and IS2'. For example, the sequences IS1 and IS2 may have been obtained for two contestants in a down-hill racing competition, and they may be synchronized by the module 11 so that the first frame of each sequence corresponds to its contestant leaving the starting gate.

The synchronized sequences are fed to a module 12 for background-foreground extraction, as well as to a module 13 for camera coordinate transformation estimation. For each of the image sequences, the module 12 yields a weight-mask sequence (WMS), with each weight mask being an array having an entry for each pixel position and differentiating between the scene of interest and the background/foreground. The generation of the weight mask sequence involves computerized searching of images for elements which, from frame to frame, move relative to the background. The module 13 yields sequence parameters SP1 and SP2 including camera angles of azimuth and elevation, and camera focal length and aperture among others. These parameters can be determined from each video sequence by computerized processing including interpolation and matching of images. Alternatively, a suitably equipped camera can furnish the sequence parameters directly, thus obviating the need for their estimation by computerized processing.

The weight-mask sequences WMS1 and WMS2 are fed to a module 13 for "alpha-layer" sequence computation. The alpha layer is an array which specifies how much weight each pixel in each of the images should receive in the composite image.

The sequence parameters SP and SP2 as well as the alpha layer are fed to a module 15 for projecting the aligned image sequences in a chosen focal plane, resulting in the desired composite image sequence. This is exemplified further by FIGS. 2A, 2B, 3A, 3B, 4 and 5

Figure 2A:
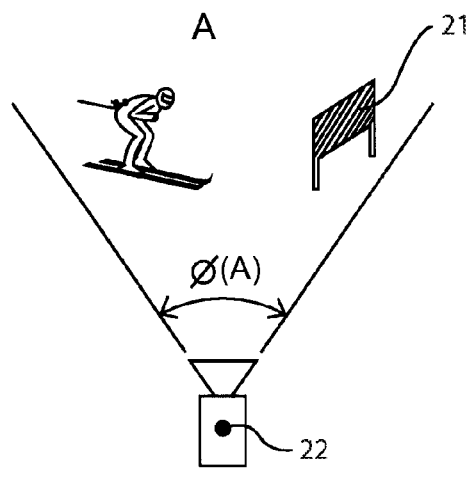
FIGS. 2A and 2B are schematics of different downhill skiers passing before a video camera.

FIG. 2A shows a skier A about to pass a position marker 21, with the scene being recorded from a camera position 22 with a viewing angle $\phi(A)$. The position reached by A may be after an elapse of t(A) seconds from A's leaving the starting gate of a race event.

Figure 2B:
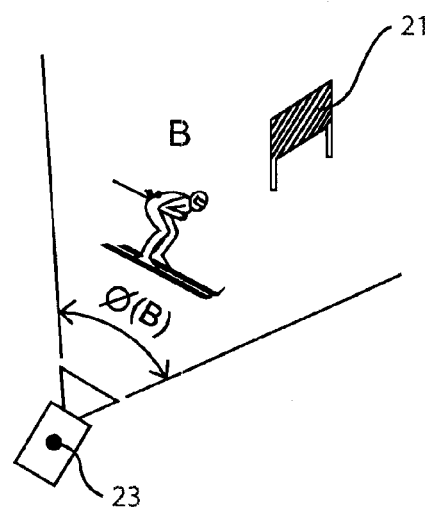

FIG. 2B shows another skier, B, in a similar position relative to the marker 21, and with the scene being recorded from a different camera position 23 and with a different, more narrow viewing angle $\phi(B)$. For comparison with skier A, the position of skier B corresponds to an elapse of t(A) seconds from B leaving the starting gate. As illustrated, within t(A) seconds skier B has traveled farther along the race course as compared with skier A.

Figure 3A:
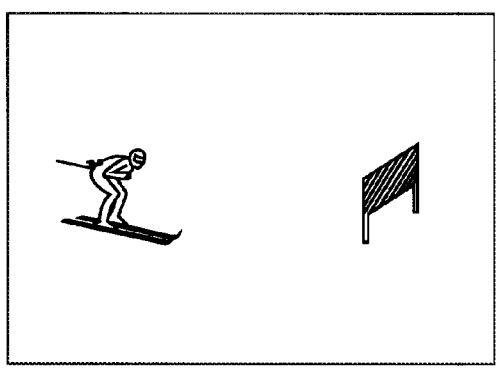
FIGS. 3A and 3B are schematics of images recorded by the video camera, corresponding to FIGS. 2A and 2B.
Figure 3B:
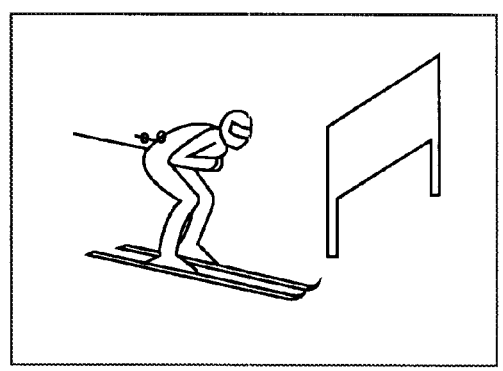

FIGS. 3A and 3B show the resulting respective images.

Figure 4:
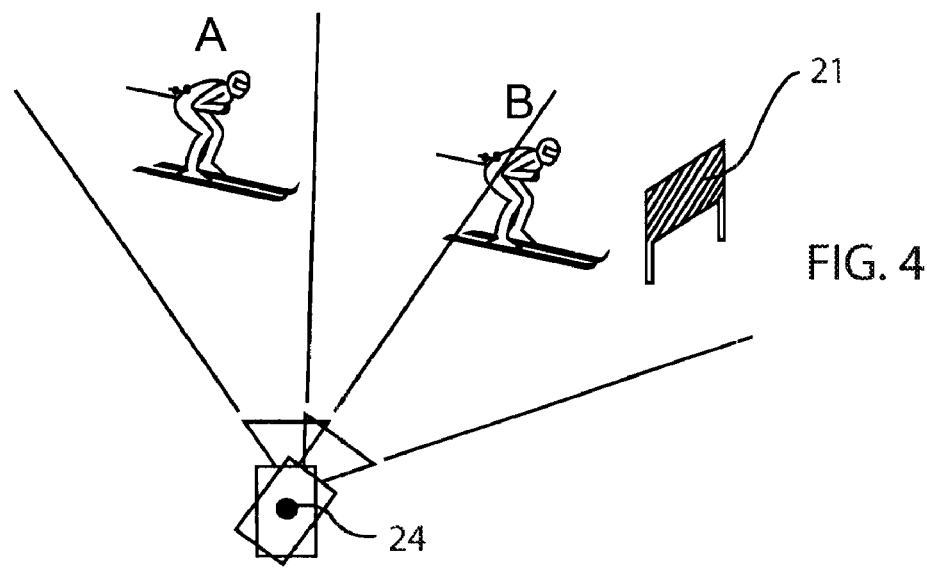
FIG. 4 is a schematic of FIGS. 2A and 2B combined.

FIG. 4 shows a combination with FIGS. 2A and 2B superposed at a common camera location.

Figure 5:
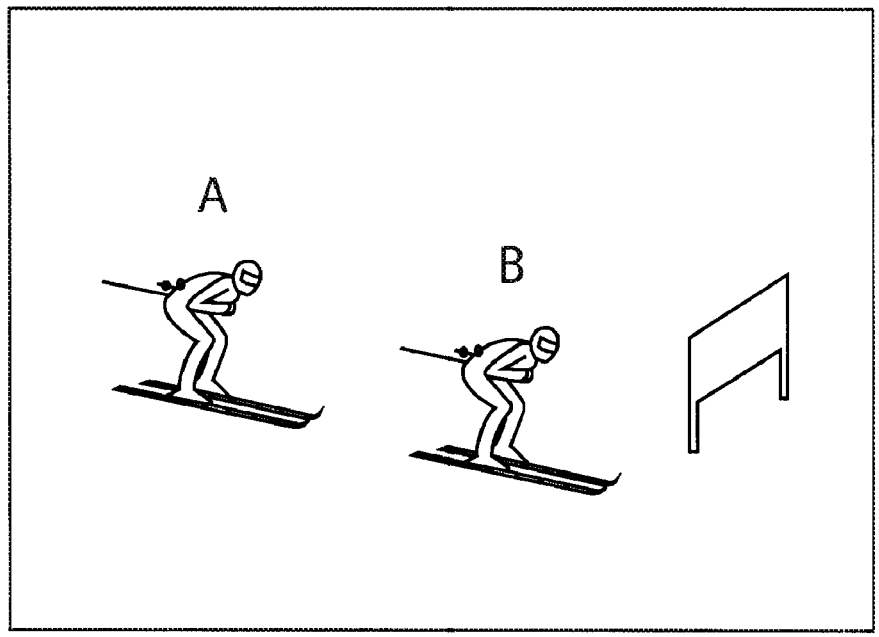
FIG. 5 is a schematic of the desired video image, with the scenes of FIGS. 3A and 3B projected in a chosen focal plane.

FIG. 5 shows the resulting desired image projected in a chosen focal plane, affording immediate visualization of skiers A and B as having raced jointly for t(A) seconds from a common start.

Figure 6:
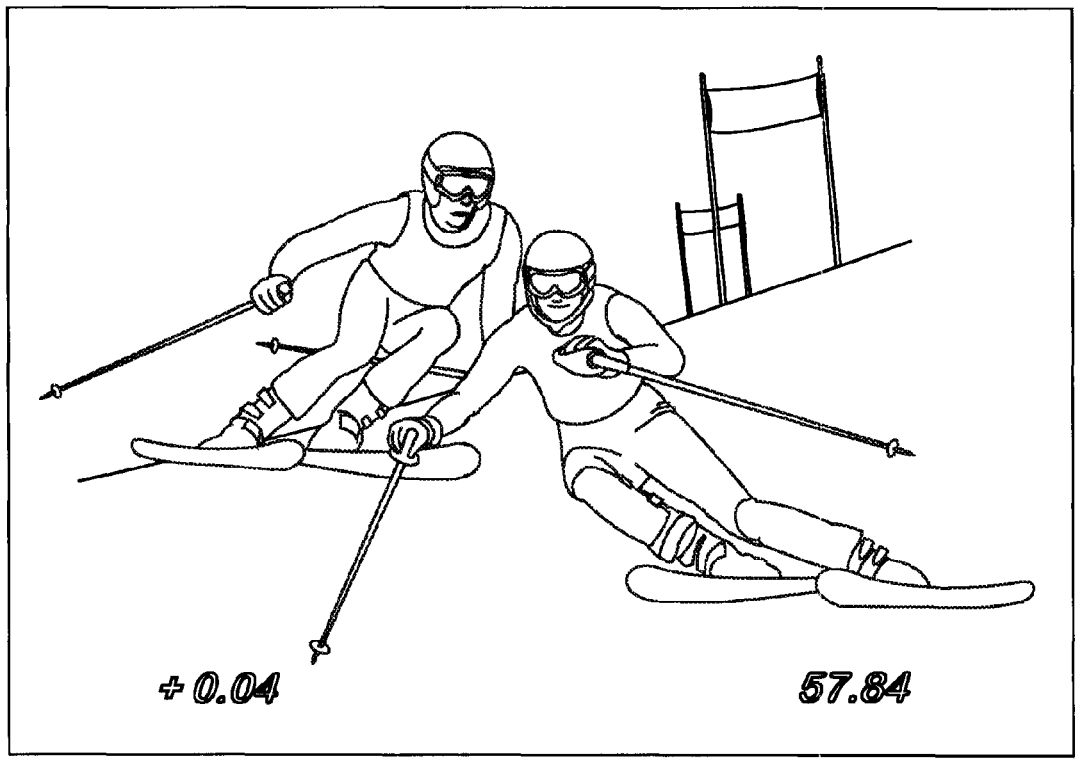
FIG. 6 is a frame from a composite video sequence which was made with a prototype implementation of the invention.

FIG. 6 shows a frame from a composite image sequence generated by a prototype implementation of the technique, with the frame corresponding to a point of intermediate timing. The value of 57.84 is the time, in seconds, that it took the slower skier to reach the point of intermediate timing, and the value of +0.04 (seconds) indicates by how much he is trailing the faster skier.

The prototype implementation of the technique was written in the "C" programming language, for execution on a SUN Workstation or a PC, for example. Dedicated firmware or hardware can be used for enhanced processing efficiency, and especially for signal processing involving matching and interpolation.

Individual aspects and variations of the technique are described below in further detail.

A. Background/Foreground Extraction

In each sequence, background and foreground can be extracted using a suitable motion estimation method. This method should be "robust", for background/foreground extraction where image sequences are acquired by a moving camera and where the acquired scene contains moving agents or objects. Required also is temporal consistency, for the extraction of background/foreground to be stable over time. Where both the camera and the agents are moving predictably, e.g. at constant speed or acceleration, temporal filtering can be used for enhanced temporal consistency.

Based on determinations of the speed with which the background moves due to camera motion, and the speed of the skier with respect to the camera, background/foreground extraction generates a weight layer which differentiates between those pixels which follow the camera and those which do not. The weight layer will then be used to generate an alpha layer for the final composite sequence.

B. Spatio-Temporal Alignment of Sequences

Temporal alignment involves the selection of corresponding frames in the sequences, according to a chosen criterion. Typically, in sports racing competitions, this is the time code of each sequence delivered by the timing system, e.g. to select the frames corresponding to the start of the race. Other possible time criteria are the time corresponding to a designated spatial location such as a gate or jump entry, for example.

Spatial alignment is effected by choosing a reference coordinate system for each frame and by estimating the camera coordinate transformation between the reference system and the corresponding frame of each sequence. Such estimation may be unnecessary when camera data such as camera position, viewing direction and focal length are recorded along with the video sequence. Typically, the reference coordinate system is chosen as one of the given sequences—the one to be used for the composite sequence. As described below, spatial alignment may be on a single-frame or multiple-frame basis.

B.1 Spatial Alignment on a Single-Frame Basis

At each step of this technique, alignment uses one frame from each of the sequences. As each of the sequences includes moving agents/objects, the method for estimating the camera coordinate transformation needs to be robust. To this end, the masks generated in background/foreground extraction can be used. Also, as motivated for background/foreground extraction, temporal filtering can be used for enhancing the temporal consistency of the estimation process.

B.2 Spatial Alignment on a Multiple-Frame Basis

In this technique, spatial alignment is applied to reconstructed images of the scene visualized in each sequence. Each video sequence is first analyzed over multiple frames for reconstruction of the scene, using a technique similar to the one for background/foreground extraction, for example. Once each scene has been separately reconstructed, e.g. to take in as much background as possible, the scenes can be spatially aligned as described above.

This technique allows free choice of the field of view of every frame in the scene, in contrast to the single-frame technique where the field of view has to be chosen as the one of the reference frame. Thus, in the multiple-frame technique, in case that all contestants are not visible in all the frames, the field and/or angle of view of the composite image can be chosen such that all competitors are visible.

C. Superimposing of Video Sequences

After extraction of the background/foreground in each sequence and estimation of the camera coordinate transformation between each sequence and a reference system, the sequences can be projected into a chosen focal plane for simultaneous visualization on a single display. Alpha layers for each frame of each sequence are generated from the multiple background/foreground weight masks. Thus, the composite sequence is formed by transforming each sequence into the chosen focal plane and superimposing the different transformed images with the corresponding alpha weight.

D. Applications

Further to skiing competitions as exemplified, the techniques of the invention can be applied to other speed/distance sports such as car racing competitions and track and field, for example.

Further to visualizing, one application of a composite video sequence made in accordance with the invention is apparent from FIG. 6, namely for determining differential time between two runners at any desired location of a race. This involves simple counting of the number of frames in the sequence between the two runners passing the location, and multiplying by the time interval between frames.

A composite sequence can be broadcast over existing facilities such as network, cable and satellite TV, and as video on the Internet, for example. Such sequences can be offered as on-demand services, e.g. on a channel separate from a strictly real-time main channel. Or, instead of by broadcasting over a separate channel, a composite video sequence can be included as a portion of a regular channel, displayed as a corner portion, for example.

In addition to their use in broadcasting, generated composite video sequences can be used in sports training and coaching. And, aside from sports applications, there are potential industrial applications such as car crash analysis, for example.

It is understood that composite sequences may be higher-dimensional, such as composite stereo video sequences.

In yet another application, one of the given sequences is an audio sequence to be synchronized with a video sequence. Specifically, given a video sequence of an actor or singer, A, speaking a sentence or singing a song, and an audio sequence of another actor, B, doing the same, the technique can be used to generate a voice-over or "lip-synch" sequence of actor A speaking or singing with the voice of B. In this case, which requires more than mere scaling of time, dynamic programming techniques can be used for synchronization.

The spatio-temporal realignment method can be applied in the biomedical field as well. For example, after orthopedic surgery, it is important to monitor the progress of a patient's recovery. This can be done by comparing specified movements of the patient over a period of time. In accordance with an aspect of the invention, such a comparison can be made very accurately, by synchronizing start and end of the movement, and aligning the limbs to be monitored in two or more video sequences.

Another application is in car crash analysis. The technique can be used for precisely comparing the deformation of different cars crashed in similar situations, to ascertain the extent of the difference. Further in car crash analysis, it is important to compare effects on crash dummies. Again, in two crashes with the same type of car, one can precisely compare how the dummies are affected depending on configuration, e.g. of safety belts.

The invention claimed is:

1. A method for generating a composite video sequence from a plurality of given video sequences, comprising the steps of:
   (a) synchronizing, using at least one of a workstation, a personal computer, and dedicated processing hardware, the given video sequences into a corresponding plurality of synchronized video sequences;
   (b) choosing a camera reference coordinate system for each frame of each synchronized video sequence and obtaining, using at least one of a workstation, a personal computer, and dedicated processing hardware, a camera coordinate transformation between the camera reference coordinate system and the corresponding frame of each of the synchronized video sequences; and
   (c) forming, using at least one of a workstation, a personal computer, and dedicated processing hardware, the composite video sequence from the synchronized video sequences by transforming each sequence based on the camera coordinate transformation into a chosen focal plane and by superimposing the transformed sequences for merged simultaneous visualization on a single display.

2. The method according to claim 1, wherein the camera coordinate transformation is estimated from the plurality of synchronized video sequences.

3. The method according to claim 1, wherein the camera coordinate transformation is obtained from recorded camera position data and parameters including focal length.

4. The method according to claim 1, wherein for each video sequence a respective foreground object and a background are distinguished, and wherein the transformed foreground objects are superimposed on the transformed background.

5. The method according to claim 4, further comprising the step of extracting, using at least one of a workstation, a personal computer, and dedicated processing hardware, the respective foreground object and the background for each of the synchronized video sequences.

6. The method according to claim 5, wherein extracting comprises producing a weight mask sequence, with each weight mask being an array having an entry for each pixel position for differentiating between the respective foreground object and the background.

7. The method according to claim 4, wherein synchronizing is with respect to a timed event in the given sequences.

8. The method according to claim 1, wherein synchronizing is with respect to a common spatial event in the given sequences.

9. The method according to claim 1, wherein synchronizing is with respect to two events in each of the given sequences, with time scaling for equalizing time between the events.

10. The method according to claim 1, wherein the chosen focal plane corresponds to the focal plane of one of the given sequences, and wherein the composite sequence is as viewed from the camera location of the one of the given sequences.

11. The method according to claim 1, wherein forming the composite sequences is on a frame-by-frame basis.

12. The method according to claim 1, wherein forming the composite sequence is based on several frames of at least one of the sequences, for an expanded field of view in the composite sequence as compared with the one of the sequences.

13. The method according to claim 1, wherein the given video sequences are from a sports event.

14. The method according to claim 13, wherein the sports event is a ski race.

15. The method according to claim 13, wherein the sports event is a car race.

16. The method according to claim 1, wherein the given video sequences have biomedical significance.

17. The method according to claim 16, wherein biomedical significance comprises significance as to movement of a limb of a patient.

18. The method according to claim 1, wherein the given video sequences comprise car crash test sequences.

19. The method according to claim 18, wherein the car crash test sequences comprise images of cars being tested.

20. The method according to claim 18, wherein the car crash test sequences comprise images of crash dummies in cars being tested.

21. A system for generating a composite video sequence from a plurality of given video sequences, comprising:
   (a) means for synchronizing the given video sequences into a corresponding plurality of synchronized video sequences;
   (b) means for choosing a camera reference coordinate system for each frame of each synchronized video sequence and obtaining a camera coordinate transformation between the camera reference coordinate system and the corresponding frame of each of the synchronized video sequences; and
   (c) means for forming the composite video sequence from the synchronized video sequences by transforming each sequence based on the camera coordinate transformation into a chosen focal plane and by superimposing the transformed sequences for merged simultaneous visualization on a single display.

22. A method for determining differential time between two contestants at a specified location in a race, comprising:
   (a) synchronizing, using at least one of a workstation, a personal computer, and dedicated processing hardware, a video sequence of one of the contestants with a video sequence of the other contestant;
   (b) choosing a camera reference coordinate system for each frame of each synchronized video sequence and obtaining, using at least one of a workstation, a personal computer, and dedicated processing hardware, a camera coordinate transformation between the camera reference coordinate system and the corresponding frame of each of the synchronized video sequences;
   (c) forming, using at least one of a workstation, a personal computer, and dedicated processing hardware, a composite video sequence from the synchronized video sequences by transforming each sequence based on the camera coordinate transformation into a chosen focal plane and by superimposing the transformed sequences for merged simultaneous visualization on a single display; and
   (d) counting, using at least one of a workstation, a personal computer, and dedicated processing hardware, the number of frames between the contestants passing the location in the race.

23. A broadcast service for transmitting a composite video sequence whose generation comprises the steps of:
   (a) synchronizing, using at least one of a workstation, a personal computer, and dedicated processing hardware, a plurality of given video sequences into a corresponding plurality of synchronized video sequences;
   (b) choosing a camera reference coordinate system for each frame of each synchronized video sequence and obtaining, using at least one of a workstation, a personal computer, and dedicated processing hardware, a camera coordinate transformation between the camera reference coordinate system and the corresponding frame of each of the synchronized video sequences; and
   (c) forming, using at least one of a workstation, a personal computer, and dedicated processing hardware, the composite video sequence from the synchronized video sequences by transforming each sequence based on the camera coordinate transformation into a chosen focal plane and by superimposing the transformed sequences for merged simultaneous visualization on a single display.

* * * * *